(12) United States Patent
Bogner

(10) Patent No.: US 7,519,701 B1
(45) Date of Patent: Apr. 14, 2009

(54) SYSTEM AND METHOD OF PROPAGATING STATUS AMONG RELATED ENTITIES

(75) Inventor: Matthew Robert Bogner, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/031,751

(22) Filed: Feb. 15, 2008

(51) Int. Cl.
*G06F 15/173* (2006.01)
*G06F 15/16* (2006.01)

(52) U.S. Cl. ........................... 709/223; 709/227
(58) Field of Classification Search .......... 709/223–229
See application file for complete search history.

(56) References Cited

U.S. PATENT DOCUMENTS

| | | | |
|---|---|---|---|
| 5,261,044 A | 11/1993 | Dev et al. | |
| 5,704,036 A | 12/1997 | Brownmiller et al. | |
| 5,740,357 A | 4/1998 | Gardiner et al. | |
| 5,761,429 A * | 6/1998 | Thompson | 709/224 |
| 5,968,122 A * | 10/1999 | Schlosser et al. | 709/223 |
| 6,133,919 A * | 10/2000 | Bormann et al. | 715/839 |
| 6,138,122 A | 10/2000 | Smith et al. | |
| 6,175,876 B1 | 1/2001 | Branson et al. | |
| 6,434,626 B1 * | 8/2002 | Prakash et al. | 709/238 |
| 6,804,819 B1 | 10/2004 | Bates et al. | |
| 6,993,686 B1 * | 1/2006 | Groenendaal et al. | 714/47 |
| 7,117,273 B1 * | 10/2006 | O'Toole et al. | 709/252 |
| 7,168,077 B2 * | 1/2007 | Kim et al. | 718/106 |
| 7,251,690 B2 * | 7/2007 | Williams | 709/224 |
| 7,272,531 B2 * | 9/2007 | Kavaklioglu et al. | 702/182 |
| 2001/0044840 A1 * | 11/2001 | Carleton | 709/223 |
| 2003/0037177 A1 * | 2/2003 | Sutton et al. | 709/316 |
| 2003/0140139 A1 * | 7/2003 | Marejka et al. | 709/224 |
| 2004/0064542 A1 * | 4/2004 | Williams | 709/224 |
| 2007/0223917 A1 * | 9/2007 | Nagamine | 398/1 |

\* cited by examiner

*Primary Examiner*—Joseph E Avellino
(74) *Attorney, Agent, or Firm*—MaxValueIP, LLC

(57) ABSTRACT

This system, as an example, addresses the method that health status could be propagated throughout an entire hierarchical system with parent and child relationships. This system, as an example, operates as the lowest layer child reports a health status change to its immediate parent. The immediate parent receives the status and updates its local health counts for its entire child domain. Then, using this health counts and child weights recalculates its own health status and reports this new status to its immediate parent. This process is repeated in every layer and at the highest layer, when the parent node receives the health status change report from its immediate child and updates the status counts for its entire child domain and using the predetermined rules and weight associated to the child and health counts recalculates the final health of the system.

1 Claim, 4 Drawing Sheets

SYSTEM AND METHOD OF PROPAGATING STATUS AMONG RELATED ENTITIES

BACKGROUND OF THE INVENTION

Propagating a "health" status over an entire database of entities is a time-consuming, deadlock-prone, resource-intensive operation. As an example, when a fibre-channel switch port changes state from nominal to critical, the health status of the owning switch should likely be modified to some marginal status to indicate a problem within the switch. Likewise, once this switch's health status has changed to marginal, the status for the entire fibre-channel fabric that owns the individual switch should be modified as well. This changing of the health status of one entity can produce a "waterfall" or "cascading" effect to other related entities.

This problem is not isolated to SAN (Storage Area Network) or fibre-channel devices, and could apply to any systems management software which stores any kind of "health" status, in which that health is based, in part, on the subordinate entities related to it. Another example is a monitored application which quits unexpectedly. In this situation the application's status changes to critical which in fact causes application server's status to change to marginal, which will subsequently causes the physical server's status to change to marginal which finally cause the status of resource pool's to change to marginal.

A commonly-used solution in the relational database systems is to use relational database triggers such as Standard Query Language (SQL) triggers. SQL Triggers are standardized as part of American National Standards Institute (ANSI) ANSI/ISO/IEC 9075-2:2003, Information Technology, Database languages: SQL. Database triggers are used to propagate the health upwards to dependent database entities. There is one major problem with using this approach which if the trigger uses the old and new health status for the changed entity (i.e. a fibre-channel port), that is not enough information to determine if the parent entity (i.e. a fibre-channel switch) needs to have its health status changed.

SUMMARY OF THE INVENTION

This exemplary system addresses a method in which the health status could be propagated throughout an entire hierarchical system with parent and child relationships. This method/algorithm is not specific to storage or databases and can be applied in any situation where one widget is a child of another widget, and where the parent widget's "health" depends on the "health" of its children. This system is also not limited to two layers architecture as it could be expanded to any number of layers.

The system and method operates (for example) as the lowest layer child reports a health status change to its immediate parent. The immediate parent receives the status and updates its local health counts for its entire child domain. Then, using this health counts and child weights recalculates its own health status and reports this new status to its immediate parent. This process is repeated in every layer of the architecture.

At the highest layer, the parent node receives the health status change report from its immediate child and updates the status counts for its entire child domain and using the predetermined rule, weight associated to the child and health counts recalculates the final health of the system and presents it.

DETAILED DESCRIPTION OF THE PREFERRED EMBODIMENTS

This exemplary system addresses the method in which health status could be propagated throughout an entire hierarchical system with parent and child relationships, such as a relational database (in case of a relational database example, without having to perform "batch" updates and touching every record in the database). The solution described below results in faster processing times, because of fewer database reads, which also results in a reduced risk of query deadlock, thus, improving application performance and resiliency.

It should be mentioned that Universal Modeling Language (UML) standard is used to draw the class diagrams (FIGS. 1, 2 and 4) describing the parent child relationship and their behavior in the discussed hierarchical systems. In these class diagrams classes are represented by rectangles which show the name of the class and optionally the name of the operations and attributes. Compartments are used to divide the class name, attributes and operations. Aggregations are used to depict elements which are made up of smaller components or dependency of smaller components. Aggregation relationships are shown by a white diamond-shaped arrowhead pointing towards the target or parent class. Multiplicity is shown by numbers on the aggregation relationship lines (i.e. multiplicity of 1 . . . n means any number from 1 to n).

Figure 1:
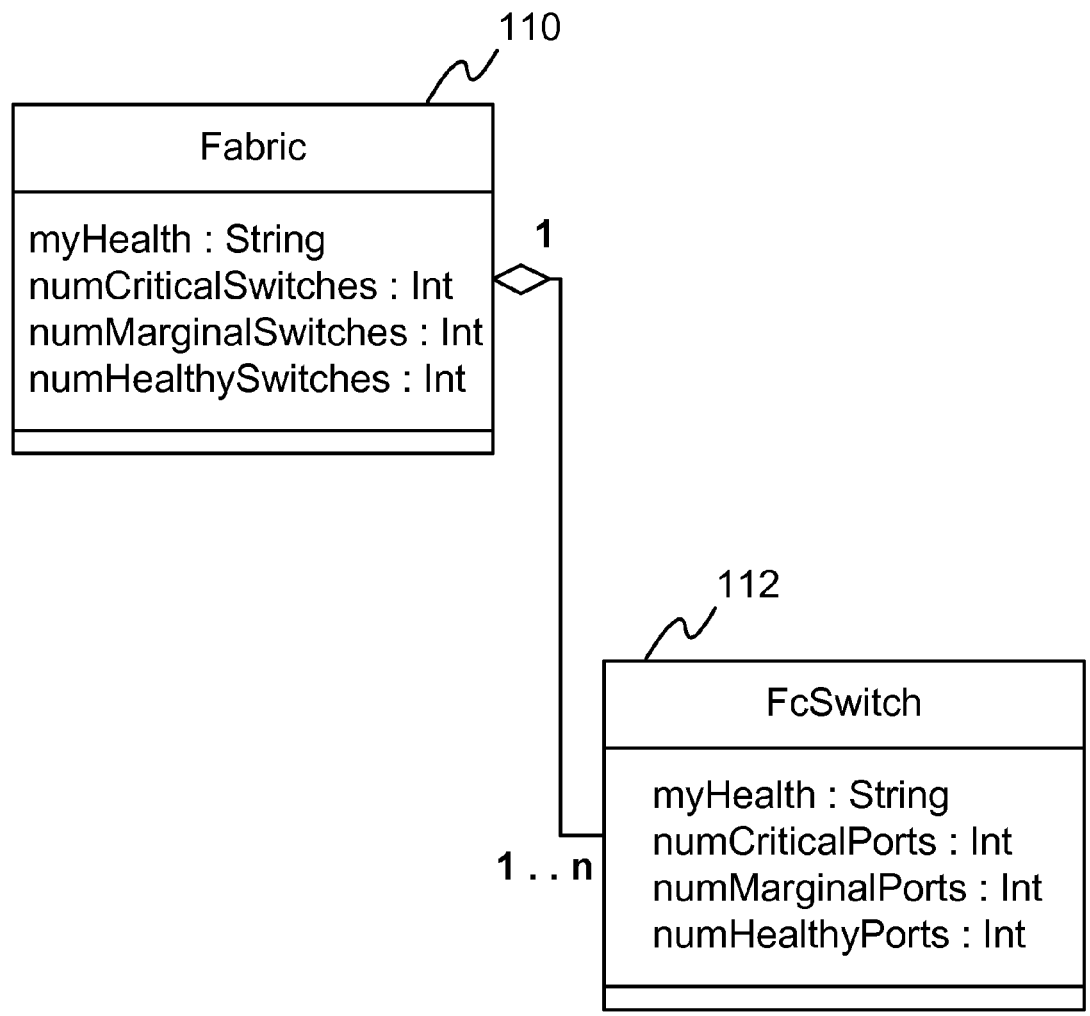
FIG. 1 is an example class diagram of a Fibre-channel two layer hierarchical system.

This embodiment is described as an example for a fibre-channel (FC) fabric with many fibre-channel switches and each switch with many ports (FIG. 1). The fabric class "Fabric" (FIG. 1, 110) is the parent and its health status is dependent on many fibre switches (1 to n "FcSwitch" class to FIG. 1, 112). This class presents a global health status "myHealth" for FC fabric. This health status is calculated based on status of its child switches through the "numCriticalSwitchs", "numMarginalSwitches" and "numHealthySwitches" counts updated from health status reported by its child switches "FcSwitch".

Each fibre-switch (child class "FcSwitch") contains many ports and its health status depends on the health status of its ports through the "numCriticalPorts", "numMarginalPorts" and "numHealthyPorts" and reflected in the "myHealth" status. When a port's health status is changed in the in the child ("FcSwith", FIG. 1, 112), based on the criticality of the port the appropriate health status counts in that switch is updated (FIG. 1, 112, "numCriticalPorts", "numMarginalPorts" or "numHealthyPorts") and based on a predetermined rule the local status for that switch (FIG. 1, 112, "myHealth") is updated.

At this point, the change of the status is reported back to the parent "Fabric" (FIG. 1, 110). The parent updates the status counts for child switch (FIG. 1, 110, "numCriticalSwitchs", "numMarginalSwitches" and "numHealthySwitches"). At this stage based on a predetermined rule fabric status "myHealth" (FIG. 1, 110) is updated and presented. The three status levels specified above is just an example and by no means restrictive as any child and parent could have many different status levels and criteria.

Figure 2:
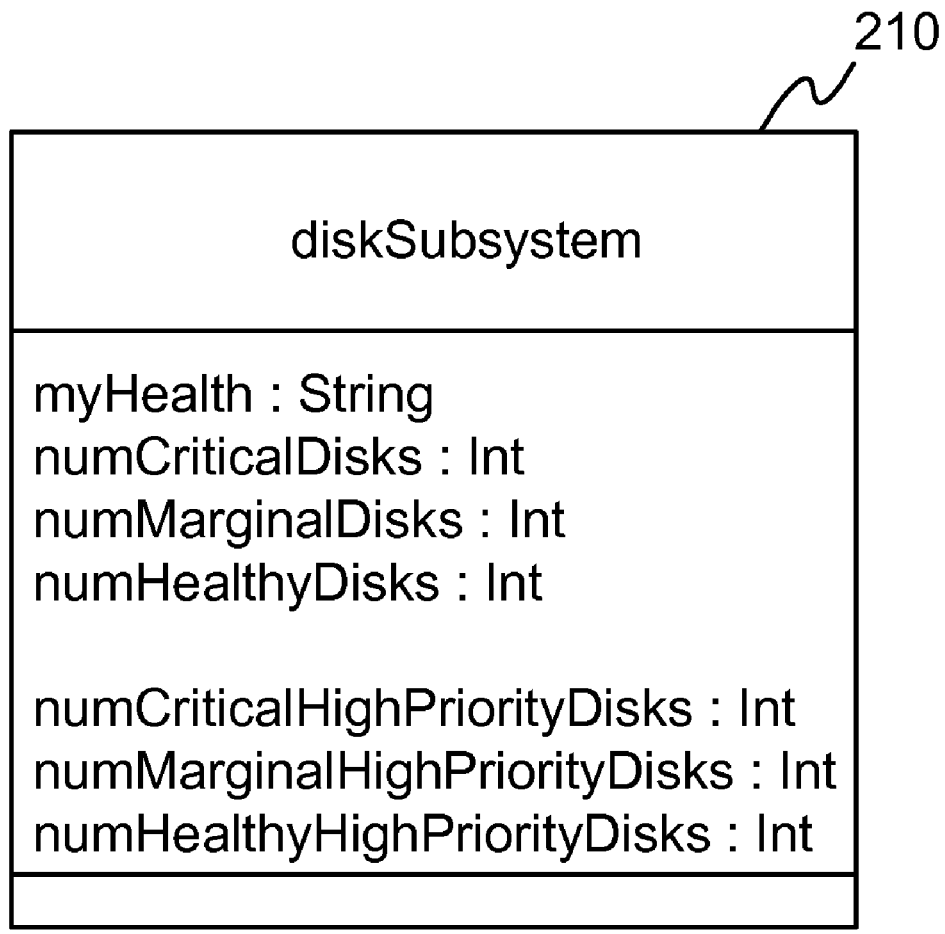
FIG. 2 is the example of a parent child-class diagram, when both priority and weight is considered.

Another embodiment of this system is depicted in FIG. 2 where some child entities could have when determining the "myHealth" status of the parent entity. Example is a disk system which is entirely possible that for some business implications, one particular subsystem disk (child) might be extremely important and thus if it changes to any form of degraded state, the whole subsystem should be considered "critical". In this case as depicted in FIG. 2, the status of the subsystem "diskSubsystem" in FIG. 2, 210 is determined not only by count of the criticality of the subsystem disks (FIG. 2, 210, "numCriticalDisks", "numMarginalDisks" and "numHealthyDisks"), but also priority counts of the disks (FIG. 2, 210, "numCriticalHighPriorityDisks", "numMarginalHighPriorityDisks" and "numHealthyHighPriorityDisks". And the ultimate health of the disk subsystem is determined by a predetermined rule defining the relationship of the criticality counts and priority counts.

Figure 3:
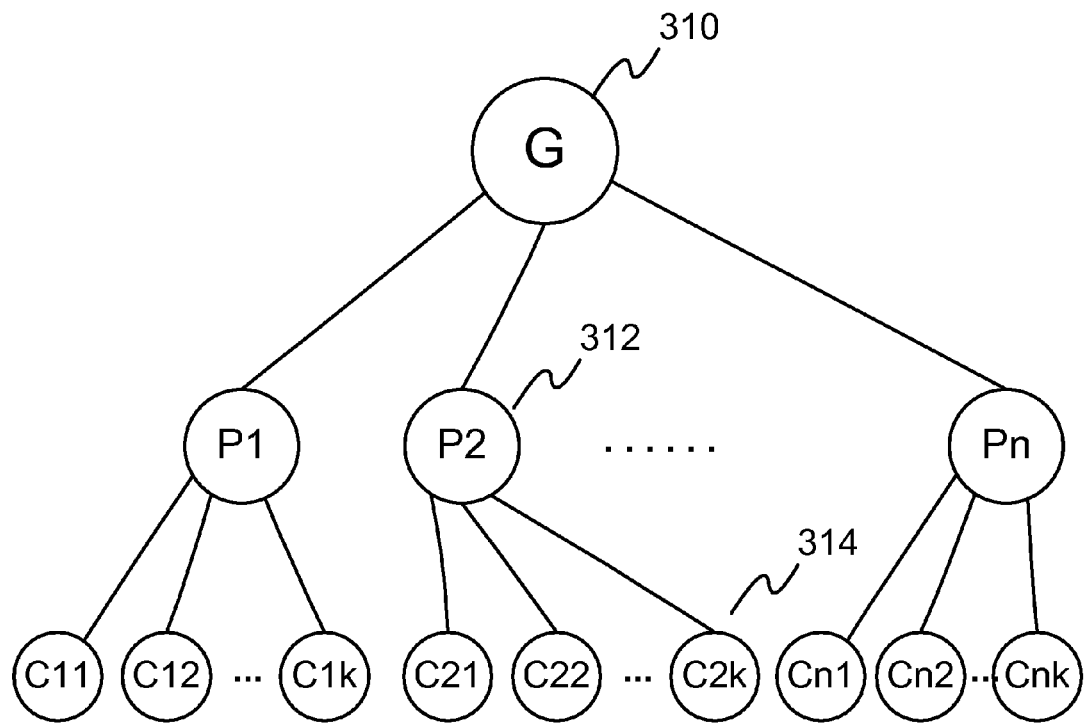
FIG. 3 is an example of a three-layer hierarchical system.

Another embodiment of this system is depicted in FIG. 3. This system consists of a grand parent node G (FIG. 3, 310), which consists of 1 to n parent child nodes P1 to Pn (FIG. 3, 312 layer), where each parent child is consist of 1 to k child nodes (FIG. 3, 314, C11-C1k, C21-C2k, ..., Cn1-Cnk). The depicted system is by no means limited to 3 layers, as the 3-layer system is selected for simplicity. These nodes could be coupled together physically, electronically, electrically, or based on a communication medium. Each child (FIG. 4, 414) tracks its own priority and health (FIG. 4, 414, "myHealth" and "myPriority").

Figure 4:
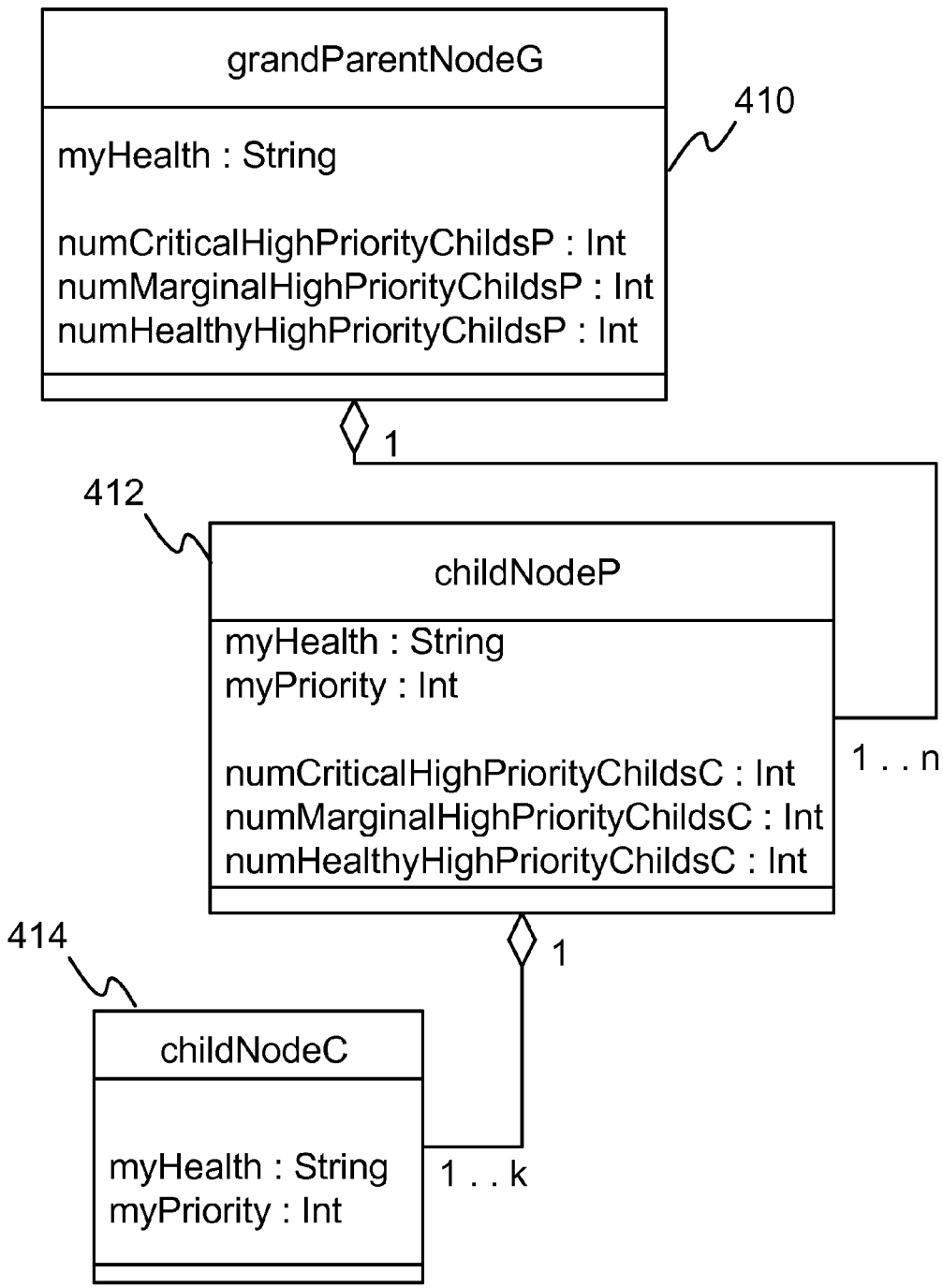
FIG. 4 is an example of class diagram for the three-layer hierarchical system.

As the status a child node is changed, this new status and its priority is reported to its immediate parent "childNodeP" (FIG. 4, 412). The immediate parent receives this information and updates its child health counts (FIG. 4, 412, "numCriticalHighPriorityChildsC", numMarginalHighPriorityChildsC" and "numHealthyHighPriorityChildsC") and based on some predetermined rule updates its own local health "myHealth". This health status is later reported to its immediate parent "grandParentNodeG" (FIG. 4, 410) which in turn updates its own health status counts for its immediate child (FIG. 4, 410, "numCriticalHighPriorityChildP", "numMarginalHighPriorityChildP" and "numHealthHighPriorityChildP"), and based on some predetermined rule, the grand parent node G uses these child health counts and determines its new health status "myHealth" which is presented. In hierarchy of FIG. 4, each child node could also have weight associated to it and this weight could be used in conjunction to the priority counts to determine the health status, which will be reported to its immediate parent.

Another embodiment of this system is a method of propagating status among related entities within a system. This method comprising: determining a status of the related entities; wherein the status describes health of the related entities; wherein related entities are connected or coupled together physically, electronically, electrically, or based on a communication medium; wherein the status of the related entities are cascaded together in a cascaded structure; updating the status of a first one of the related entities; propagating the status of the first one of the related entities through rest of the related entities; assigning weights to each of the related entities; updating the status of the rest of the related entities based on the weights assigned to each of the related entities; defining one or more child entities and one or more parent entities, for the first one of the related entities, based on the cascaded structure; reviewing the status of the one or more child entities and the one or more parent entities; and getting an overall status of the system, based on the status of the related entities and the status of the one or more child entities and one or more parent entities, and based on relative weights assigned to one or more child entities and one or more parent entities.

A system, apparatus, or device comprising one of the following items is an example of the invention: database, SAN, application server, resource pool, SQL, storage devices, RAID, server, client device, PDA, mobile device, cell phone, storage to store the messages, router, switches, network, communication media, cables, fiber optics, physical layer, buffer, nodes, packet switches, computer monitor, or any display device, applying the method mentioned above, for the purpose of propagating status among related entities.

Any variations of the above teaching are also intended to be covered by this patent application.

The invention claimed is:

1. A method of propagating health status among related entities within a fibre-channel fabric system, said method comprising:
    analyzing a fibre-channel fabric comprising multiple fibre-channel switches;
    wherein each of said multiple fibre-channel switches comprises multiple ports;
    using a universal modeling language to draw classes' diagrams, describing parent-child relationship and behavior in a hierarchical system;
    showing names of said classes, with names of operations and attributes, and health status;
    using compartments to divide said classes' names, said attributes, and said operations;
    when said health status assumes one status chosen from following list: critical, marginal, or healthy;
    aggregating elements which are made up of smaller components or depend on smaller components;
    displaying aggregation relationship by a line and an icon pointing towards a parent class;
    displaying multiplicity by a positive integer number on said aggregation relationship line;
    determining said health status of each of said multiple fibre-channel switches based on said health status of said multiple ports with a child relationship with respect to said each of said multiple fibre-channel switches;
    wherein said health status of each of said multiple fibre-channel switches is updated based on priority assigned to each of said multiple ports;
    wherein if one of said multiple ports has a high priority and is in marginal or critical state, then said each of said multiple fibre-channel switches is in critical state;
    assigning a weight to each child node in conjunction to each priority value;
    cascading said health status for related entities in a cascaded structure;
    updating said health status of a first entity of said related entities;
    propagating said health status of said first entity of said related entities through rest of said related entities, based on relative weights assigned to each child entity;
    determining said health status of said fibre-channel fabric based on said health status of said fibre-channel fabric's child switches;
    wherein said health status of said fibre-channel fabric is updated based on priority assigned to each of said fibre-channel fabric's child switches;
    wherein if one of said fibre-channel fabric's child switches has a high priority and is in marginal or critical state, then said fibre-channel fabric is in critical state.

* * * * *